US008021140B2

(12) United States Patent
Hanson et al.

(10) Patent No.: US 8,021,140 B2
(45) Date of Patent: Sep. 20, 2011

(54) LINEAR BEARING ASSEMBLY TO GUIDE MOVEMENT OF ROLL STAND ON APPARATUS FOR FORMING AN EXTRUDED SHEET PRODUCT

(75) Inventors: Dana R. Hanson, St. Charles, IL (US); Mitchell L. Gritzner, Montgomery, IL (US); Ryan E. Leopold, Sycamore, IL (US)

(73) Assignee: Processing Technologies, LLC, Aurora, IL (US)

( * ) Notice: Subject to any disclaimer, the term of this patent is extended or adjusted under 35 U.S.C. 154(b) by 213 days.

(21) Appl. No.: 12/455,344

(22) Filed: Jun. 1, 2009

(65) Prior Publication Data

US 2010/0303943 A1 Dec. 2, 2010

(51) Int. Cl.
*B29C 43/46* (2006.01)
(52) U.S. Cl. ......... 425/186; 425/194; 425/327; 425/363
(58) Field of Classification Search .................. 425/162, 425/186, 193, 194, 327, 363
See application file for complete search history.

(56) References Cited

U.S. PATENT DOCUMENTS

| 4,194,872 | A | * | 3/1980 | Hinterkeuser et al. | 425/327 |
|---|---|---|---|---|---|
| 4,408,974 | A | * | 10/1983 | Comerio | 425/194 |
| 4,784,596 | A | * | 11/1988 | Heise | 425/186 |
| 4,986,745 | A | * | 1/1991 | Hagiwara | 425/327 |
| 5,006,056 | A | * | 4/1991 | Mainstone et al. | 425/186 |
| 5,167,894 | A | * | 12/1992 | Baumgarten | 425/327 |
| 5,567,448 | A | * | 10/1996 | Frankland | 425/363 |
| 6,616,877 | B2 | * | 9/2003 | Close et al. | 264/151 |
| 7,165,962 | B2 | * | 1/2007 | Hanson | 425/194 |

* cited by examiner

*Primary Examiner* — James Mackey
(74) *Attorney, Agent, or Firm* — Wood, Phillips, Katz, Clark & Mortimer

(57) ABSTRACT

An apparatus for forming an extruded sheet product having an extruder assembly with a sheet die through which flowable material is delivered for sheet product formation and a roll stand assembly with a main frame and a roll stack sub-assembly on the main frame that cause flowable material from the sheet die to be formed into a sheet product. The apparatus further has a sub-frame assembly and a linear slide bearing assembly with at least one rail defining a travel path for the main frame and through which the main frame is guided in movement relative to the sub-frame assembly, thereby to selectively vary relative positions of the sheet die and roll stand assembly along the travel path.

11 Claims, 15 Drawing Sheets

LINEAR BEARING ASSEMBLY TO GUIDE MOVEMENT OF ROLL STAND ON APPARATUS FOR FORMING AN EXTRUDED SHEET PRODUCT

BACKGROUND OF THE INVENTION

1. Field of the Invention

This invention relates to extruded sheets and, more particularly, to an apparatus for continuously forming a sheet product using cooperating rolls to which a flowable material is continuously supplied.

2. Background Art

Extruded sheets are formed from many different materials, with many different thicknesses, and with different layer constructions. An extruded sheet may be formed by itself or combined with one or more other sheet layers that are concurrently formed or combined after formation.

Common to the above apparatus is the use of an extruder assembly to deliver flowable material to a nip/lamination location on a roll stack assembly so as to initiate sheet layer formation. As this occurs, a sheet die on the extruder assembly and the roll stack assembly are in close proximity to each other. For different reasons, it may be necessary to provide a working space between the sheet die and the roll stack assembly. These components are ideally capable of being spaced adequately to allow unimpeded access to the rolls on the roll stack assembly, as well as the extruder assembly components, to permit system setup, adjustments, and/or regular maintenance.

Heretofore, the roll stack assembly has been guided for movement relative to a subjacent support therefor using casters on the roll stack assembly that move guidingly within a track. Additionally, the roll stack assembly has been integrated as a unit with both a temperature control system, for rolls on the roll stack assembly, and a central control system through which operation of the overall apparatus is programmed and coordinated. This entire unit is moved relative to the extruder assembly to create the aforementioned access/working space.

The use of casters and tracks has a number of inherent drawbacks, which are complicated by the system design wherein the roll stack assembly, temperature control system, and central control system are required to be moved together as a unit.

First of all, the initial setting up of the system using casters and tracks is relatively expensive. Typically, there will be at least four elongate components that must be leveled on a subjacent support surface. Commonly, support surfaces/flooring in facilities wherein this type of equipment is utilized are made with poured concrete that may have many variations attributable either to the initial installation or events occurring thereafter, such as breakage, shifting, etc. The flooring may have to be locally built up or ground to level each of the floor mounted track components at a constant height. This process is complicated by the fact that most of these elements have an appreciable width and are designed to facially engage a subjacent surface over substantially their entire length.

In the event that there is not a precise leveling of all of the tracks, and any other supporting and guiding components, the roll stack assembly may skew as it is repositioned, potentially resulting in a misalignment of the sheet die and a nip location on the roll stack assembly where flowable material is delivered for sheet formation.

Further, in the event that foreign matter or an object finds its way onto the tracks, the path of the moving roll stack assembly may be altered. This may significantly impair movement of the roll stack assembly and/or account for inconsistent and imprecise alignment between the sheet die and the nip location on the roll stack assembly.

By reason of having to move the temperature control system and central control system together with the roll stack assembly, it becomes necessary to incorporate a drive system that has the capacity to repeatedly move this combined unit back and forth in a predetermined path as the relationship between the roll stack assembly and sheet die is changed. Heretofore, it has been common to use a friction drive for this purpose. However, friction drives generally are not consistently and positively operable, particularly when used to advance heavy equipment. Slippage and potential component failure may result that necessitates repairs that may close down a processing line for a significant period of time.

The inability to precisely and consistently advance the roll stack assembly relative to the sheet die may also result in less than the desired precise alignment between the sheet die and rolls at the nip location where the flowable material is delivered. This could result in a compromised sheet product and potentially time consuming and costly repairs that may shut down not only the affected apparatus, but any equipment in a line that is coordinated therewith.

The industry has continued to contend with the above problems primarily because no viable solutions thereto have been devised.

SUMMARY OF THE INVENTION

In one form, the invention is directed to an apparatus for forming an extruded sheet product. The apparatus has an upstream end and a downstream end towards which a completed sheet product is directed. The apparatus includes an extruder assembly with a sheet die through which flowable material is delivered for sheet product formation. The apparatus further includes a roll stand assembly including a main frame and a roll stack sub-assembly with a plurality of rolls on the main frame that cause flowable material from the sheet die to be formed into a sheet product. The apparatus further includes a sub-frame assembly and a linear slide bearing assembly with at least one rail defining a travel path for the main frame and through which the main frame is guided in movement relative to the sub-frame assembly, thereby to selectively vary relative positions of the sheet die and at least a part of the roll stand assembly along the travel path.

In one form, the apparatus further includes a temperature control system, through which temperature of components on the roll stand assembly can be selectively controlled. The main frame is movable along the travel path relative to the temperature control system.

In one form, the apparatus also includes a central control system, through which operation of the apparatus is coordinated. The main frame is movable along the travel path relative to the central control system.

In one form, the central control system is configured to coordinate programmed operation of the apparatus.

In one form, the linear slide bearing assembly has spaced first and second rails on the sub-frame assembly.

In one form, the slide bearing assembly further includes first and second slide bearing sub-assemblies on the main frame that captively engage the first and second rails, respectively.

In one form, the first and second rails each has a length. The first and second slide bearing sub-assemblies respectively have first and second slide plates that are engaged, one each, with the first and second rails. The first slide plate is operably engageable and separable from the first rail at a first lengthwise location and slidable guidingly lengthwise relative to the first rail from the first lengthwise location to a second lengthwise location at which the first slide plate cannot be separated from the first rail by movement relative to the first rail in a direction transverse to the length of the first rail.

In one form, the first rail has an enlarged head, a base, and a reduced neck as viewed in cross-section transverse to the length of the first rail. The first slide plate extends around the enlarged head.

In one form, the first and second rails are mounted on the sub-frame assembly in fixed relationship to each other.

In one form, the sub-frame assembly has spaced, adjustable leveling assemblies that act against a subjacent support for the apparatus, thereby to allow controlled orientation of the first and second rails.

In one form, the apparatus further includes a drive assembly for controllably moving the main frame in the travel path. The drive assembly has a drive motor, an elongate shaft with an axis around which the elongate shaft is driven by the drive motor selectively in first and second turning directions, and an advancing element on the main frame. The advancing element cooperates with the elongate shaft to move guidingly along the shaft axis in first and second opposite directions as an incident of the drive motor causing the elongate shaft to be turned, respectively, in the first and second turning directions, in response to which the main frame is moved in opposite directions in the travel path.

In one form, the drive assembly further includes a support on the sub-frame assembly for the elongate shaft. The elongate shaft is supported between the drive motor and the support. The advancing element moves along the elongate shaft between the drive motor and the support. The main frame further includes a shield assembly that covers at least a part of the advancing element as the main frame moves in the travel path.

In one form, the roll stand assembly further includes a sheet take-off sub-assembly on the main frame that directs sheet product formed by the plurality of rolls away from the plurality of rolls towards the downstream end of the apparatus. The sheet take-off sub-assembly is cantilever mounted to the roll stand sub-assembly.

In one form, the first rail has a length and the roll stand assembly has a first dimension between upstream and downstream ends. The length of the first rail is approximately equal to the first dimension.

In one form, the enlarged head has an upwardly opening "V" shape, as viewed in cross-section transverse to the length of the first rail.

In one form, the sub-frame assembly includes a floor assembly that substantially fully spans and covers a region between the first and second rails.

In one form, there are spaced stops on the first rail that abut to the main frame to limit range of movement of the main frame in the travel path.

In another form, the invention is directed to a roll stand assembly to be used in conjunction with an extrusion assembly with a sheet die that delivers flowable material to the roll stand for sheet product formation. The roll stand assembly includes a main frame, a roll stack sub-assembly with a plurality of rolls on the main frame that cause flowable material delivered to an upstream end of the roll stack to be formed into a sheet product, a sheet take-off sub-assembly on the main frame that directs sheet product formed by the plurality of rolls away from the plurality of rolls towards a downstream end of the apparatus, a sub-frame assembly, and a linear bearing assembly. The linear bearing assembly includes at least one rail defining a travel path for the main frame and through which the main frame is guided in movement relative to the sub-frame assembly thereby to selectively place the roll stand in different positions relative to a sheet die on an extrusion assembly with which the roll stand assembly cooperates.

In one form, the linear slide bearing assembly includes spaced first and second rails on the sub-frame assembly and first and second slide bearing sub-assemblies on the main frame that captively engage the first and second rails, respectively.

In one form, the apparatus further includes a drive assembly for controllable movement of the main frame in the travel path. The drive assembly includes a drive motor, an elongate shaft with an axis around which the elongate shaft is driven by the drive motor selectively in first and second turning directions, and an advancing element on the main frame. The advancing element cooperates with the elongate shaft to move guidingly along the shaft axis in first and second opposite directions as an incident of the drive motor causing the elongate shaft to be turned, respectively, in the first and second turning directions, in response to which the main frame is moved in opposite directions in the travel path.

DETAILED DESCRIPTION OF THE PREFERRED EMBODIMENT

Figure 1:
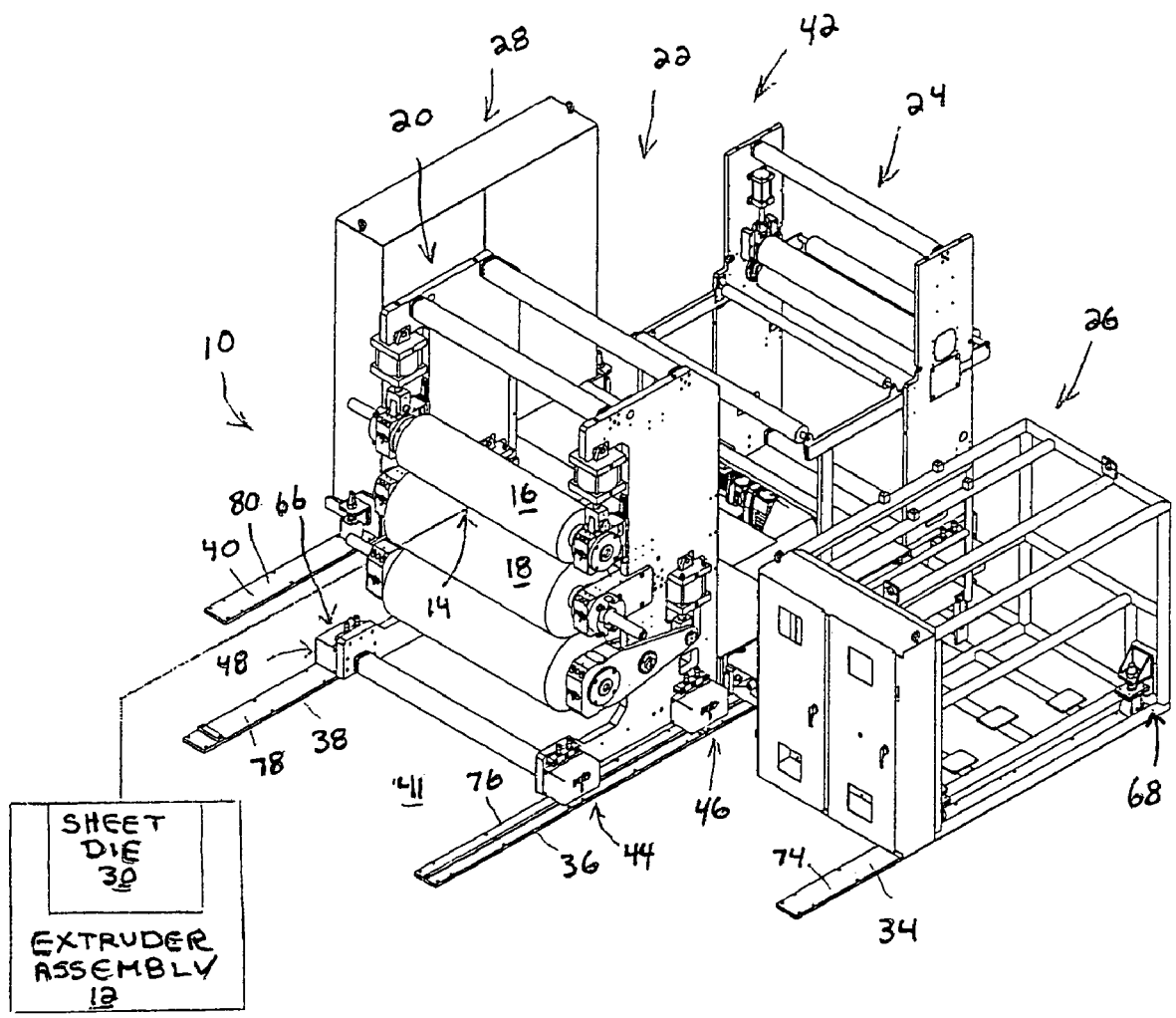
FIG. 1 is a partially schematic, perspective view of a conventional apparatus for forming an extruded sheet product and with a roll stand assembly in a retracted position relative to a sheet die on an extruder assembly.
Figure 2:
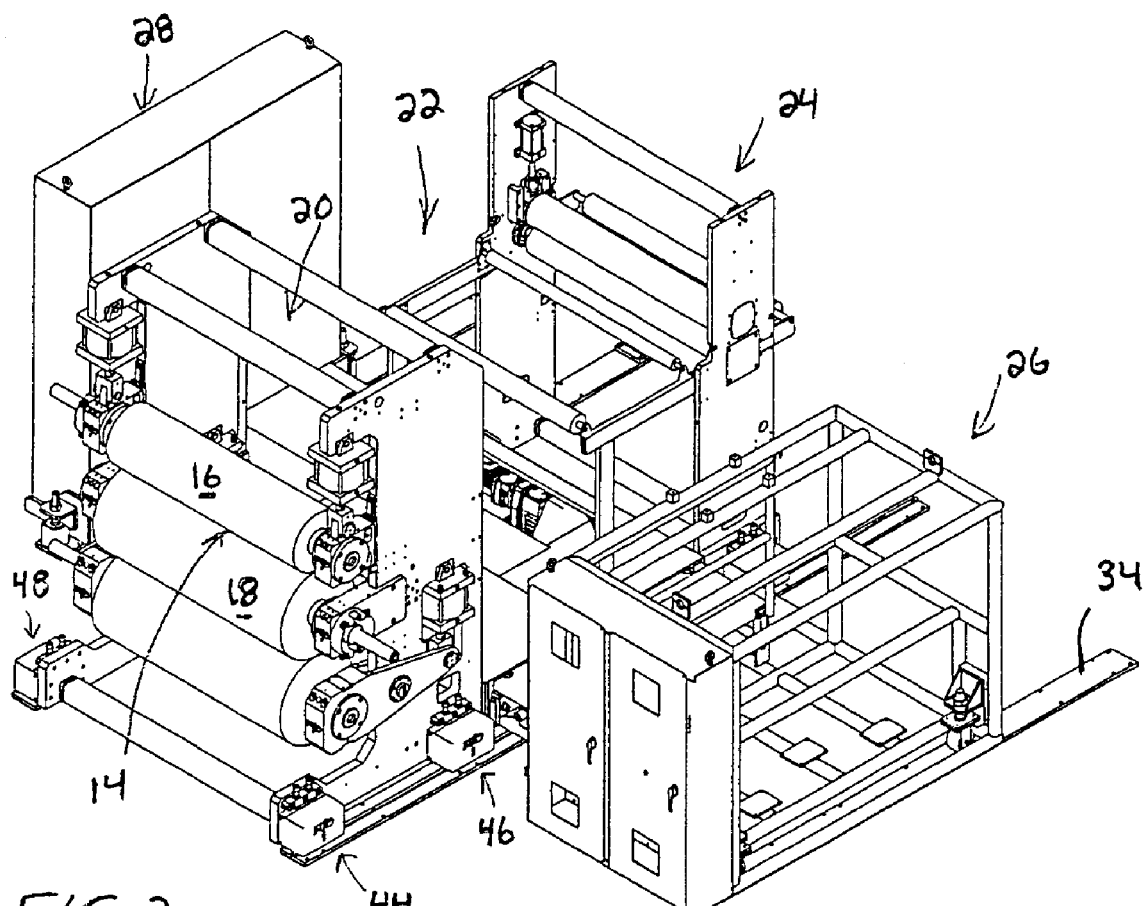
FIG. 2 is a view as in FIG. 1 wherein the roll stand assembly is changed into an operating position with respect to the extruder assembly.
Figure 3:
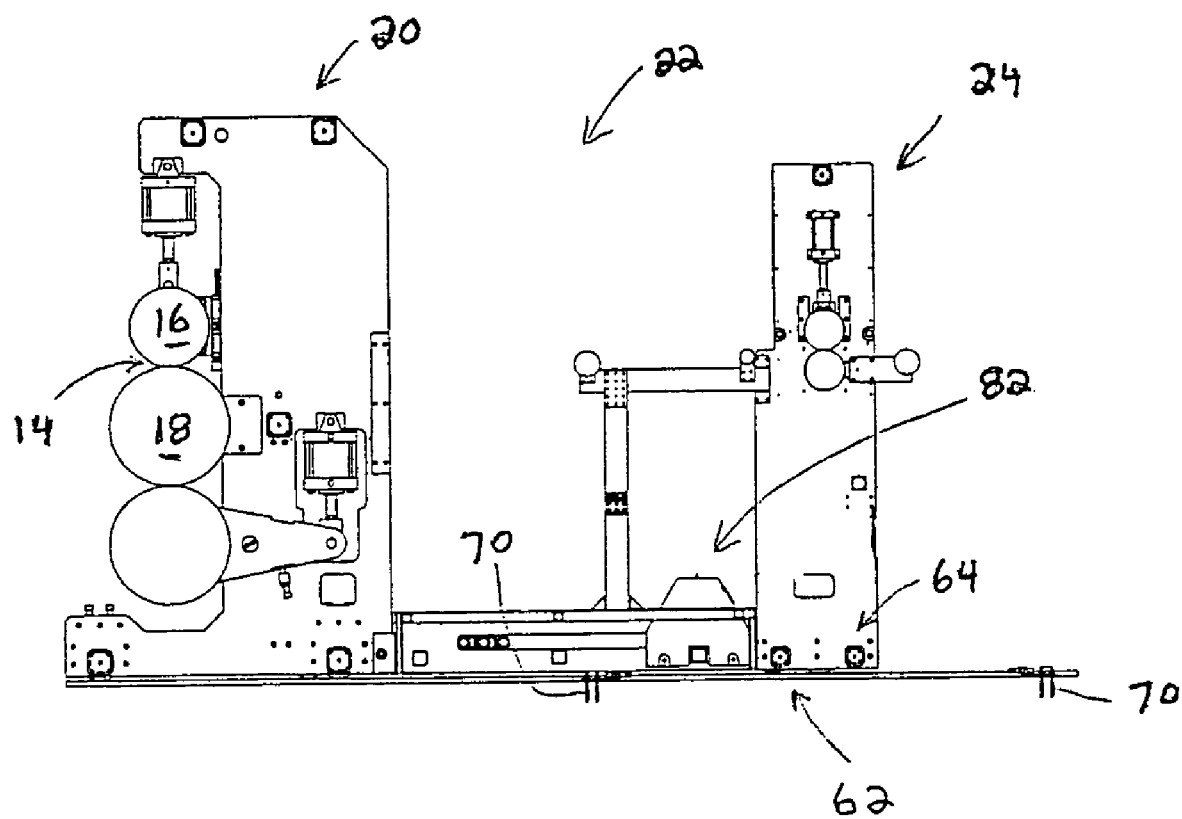
FIG. 3 is a side elevation view of the isolated roll stand assembly in the FIG. 2 operating position.

In FIGS. 1-5, a conventional apparatus for forming an extruded sheet product is shown at 10. The apparatus 10 consists of an extruder assembly 12, through which a flowable material is delivered to a nip/lamination location 14 between vertically spaced rolls 16, 18 on a roll stack sub-assembly 20. The roll stack sub-assembly 20 is part of a roll stand assembly at 22 that additionally incorporates a sheet take-off sub-assembly 24.

A temperature control system at 26 controls the temperature of the components on the roll stack sub-assembly 20, as by circulating a fluid in heat exchange relationship therewith to either raise or lower the temperature, as required, during the sheet forming process.

On the opposite side of the roll stand assembly 22, a main control system at 28 is provided. Through the central control system 28, programmable, coordinated operation of the entire apparatus 10 is carried out.

Figure 4:
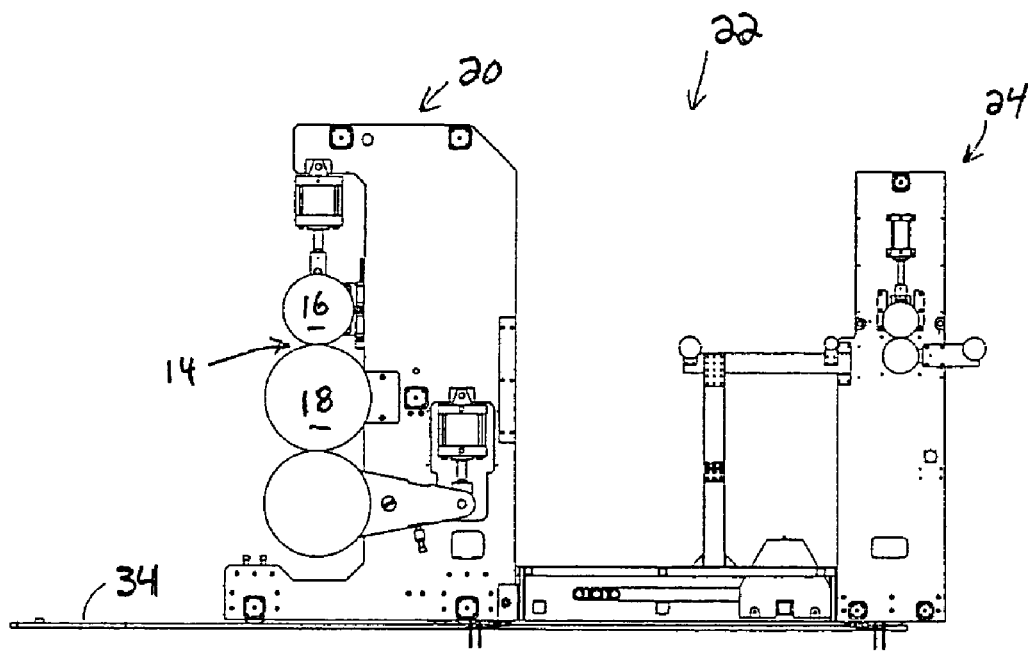
FIG. 4 is a side elevation view of the isolated roll stand assembly in the FIG. 1 retracted position.

In operation, flowable material is delivered from the extruder assembly 12 through an associated sheet die 30. As noted in the Background Art section herein, when it is desired to have access to the sheet die 30 or other components on the extruder assembly 12 at a downstream location thereon, and the components on the roll stack sub-assembly at an upstream location thereon, the spacing between the sheet die 30 and nip location 14 is enlarged, in this design by moving the roll stand assembly 22 from its operating position shown in FIGS. 2 and 3, into its retracted position as shown in FIGS. 1 and 4.

To permit guided movement of the roll stand assembly 22 between its operating and retracted positions, a series of guide tracks 32, 34, 36, 38, in this embodiment four in number, is fixed to a subjacent support surface 40. In this embodiment, the roll stand assembly 22, temperature control system 26, and central control system 28 are integrated to move as a single unit at 42 as the roll stand assembly 22 moves between its operating and retracted positions. The unit 42 is guided cooperatively by the guide tracks 32, 34, 36, 38.

The roll stack sub-assembly 20 has on one side a pair of like caster assemblies 44, 46 that cooperate with the track 36, and on the opposite side a pair of supporting pad assemblies 48 (one shown) that cooperate with the track 38.

Figure 5:
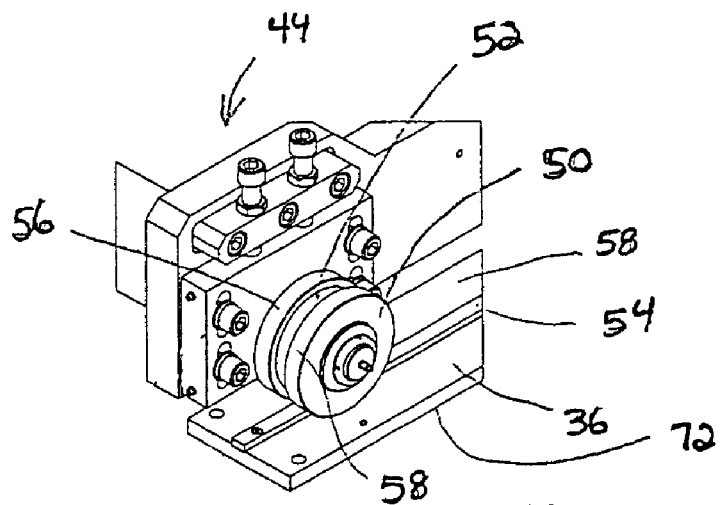
FIG. 5 is an enlarged, fragmentary, perspective view of a caster assembly that guides movement of the roll stand assembly on the apparatus in FIGS. 1-4 between the operating and retracted positions described above.

The exemplary caster assembly 44 is shown in detail in FIG. 5, as it cooperates with the guide track 36. The caster assembly 44 has a supporting wheel 50 with a central, undercut, circumferential groove 52. The groove 52 is complementary in shape to, and receives, a projecting bead 54 on the guide track 36. The bead 36 extends along the length of the guide track 36. With the bead 54 located within the groove 52, peripheral surface portions 56, 58, on axially opposite sides of the groove 52, roll against an upwardly facing surface 58 on the guide track 36 with a centered relationship between the wheel 50 and guide track 36 maintained by the guiding bead 54.

Caster assemblies 62, 64 are provided at the bottom of the sheet take-off sub-assembly 24 and cooperate with the guide track 36 in the same manner that the caster assemblies 44, 46 cooperate therewith.

The roll stand assembly 22, at the side thereof adjacent to the central control assembly 28, the central control system 28, and the temperature control system 26 each has multiple guide pad assemblies (one shown at 66 on the roll stand assembly 22 and at 68 on the temperature control system) that cooperate respectively with the guide tracks 38, 40, 34 to thereby facilitate sliding, guided movement of the unit 42 as the roll stack sub-assembly 20 is changed between its operating and retracted positions.

Anchors 70 are directed into the support surface 40 to maintain each of the guide tracks 32, 34, 36, 38 in a desired operating position to cooperate with the caster assemblies 44, 46, 62, 64 and guide pad assemblies 66, 68.

The guide tracks 32, 34, 36, 38 are each independently anchored and have a downwardly facing surface, identified at 72 for the exemplary guide track 36, that facially engages the subjacent support surface 40. Accordingly, as noted above, to have upwardly facing surfaces 74, 76, 78, 80 on the guide tracks 32, 34, 36, 38 in coplanar relationship along their entire lengths, the surface 40 must be prepared by building up and/or grinding down discrete locations thereon to prepare the same for placement and anchoring of the guide tracks 32, 34, 36, 38. This may be a difficult and time consuming process. In the absence of a level placement of the guide tracks 32, 34, 36, 38, the alignment between the sheet die 30 and nip location 14 may not be consistently and accurately maintained, as is required for effective operation.

Given the weight and the footprint of the unit 42, there may be a tendency of one or more of the components 22, 26, 28 to hang up as an incident of which the unit 42 may skew and the alignment of the sheet die 30 with the nip location 14 may be compromised.

The weight of the unit 42 also dictates that there be a high capacity drive system, as shown generally at 82 in the form of a traction drive with a floor mounted chain. While the details thereof are not depicted, it can be understood that such a drive system 82 may be difficult and expensive to install and maintain.

Additionally, as further noted above, the alignment of the sheet die 30 and nip location 14 with the roll stack sub-assembly 20 in the operating position may be compromised in the event that the caster assemblies 44, 46, 62, 64 reconfigure, as by wear or parts failure. Alignment may also be compromised in the event that the bead 54 is shifted or worn over time. Still further, alignment can be compromised by the presence of a foreign object or the accumulation of foreign material on any of the guide tracks 32, 34, 36, 38 or wheels 50 associated with the caster assemblies 44, 46, 62, 64.

One preferred form of the inventive apparatus 90 will now be described in detail with respect to FIGS. 6-18.

As described with respect to the conventional apparatus shown at 10 in FIGS. 1-5, the inventive apparatus 90 is designed to form an extruded sheet product. The apparatus 90 has an upstream end at 92 and a downstream end at 94 towards which a completed sheet product is directed and from where the product may be accumulated as in roll form, sheet form, or otherwise, at an appropriate staging location.

The apparatus 90 has an extruder assembly 96 with a sheet die 98 through which flowable material is delivered to a roll stack sub-assembly 100 and, more particularly, to a nip/lamination location thereon 102 between vertically adjacent rolls 104, 106 on the roll stack sub-assembly 100.

The extruder assembly 96 is shown in schematic form since it could vary greatly in form and the details thereof are not critical to the present invention. It suffices to say that the extruder assembly 96 is responsible for delivering the flowable material to and through the sheet die 98 which causes a generally even distribution of the flowable material at the nip location 102 over substantially the entire axial extent thereof.

The roll stack sub-assembly 100 is part of a roll stand assembly at 108 that is made up of the roll stack sub-assembly 100 and a sheet take-off sub-assembly 110 that directs sheet product formed by the roll stack sub-assembly 100 away therefrom towards the downstream end 94 of the apparatus 90.

It is likewise not necessary to explain details of operation of the roll stack sub-assembly 100 or sheet take-off sub-assembly 110. As noted above, these components can be used alone or combined in other arrangements to produce sheet products of different composition, thickness, and component layer makeup. The sheet product may be a single layer or may have multiple layers.

The roll stand assembly 108 has a main frame 112 upon which the roll stack sub-assembly 100 and sheet take-off sub-assembly 110 are mounted.

The apparatus 90 further includes a sub-frame assembly at 114 and a linear slide bearing assembly at 116 through which the main frame 112, and thus the roll stand assembly 108, is guided in movement relative to the sub-frame assembly 114, to thereby vary the relative positions of the sheet die and at least the nip location 102 on the roll stand assembly 108 along a travel path defined by the linear slide bearing assembly 116.

More particularly, the main frame 112 and roll stand assembly 108 are movable guidingly in a predetermined travel path between a retracted position, as shown in each of FIGS. 6, 8, 10, 12, 14, and 16, and an operating position, as shown in each of FIGS. 7, 9, 11, 13, and 15. In the operating position, the sheet die 98 is strategically positioned at the nip location 102, as most clearly seen in FIG. 17, so that the flowable material can be delivered thereat. With the main frame 112 and roll stand assembly 108 in the retracted position, a working space is defined at 118, between the sheet die 98 and roll stand assembly 108, as can be seen most clearly in FIG. 16. In the FIG. 16 position, a system operator is allowed to conveniently maneuver between the extruder assembly 96 and roll stand assembly 108 so as to effect setup and potentially carry out repairs and/or maintenance of components at locations that are not otherwise readily accessible.

The depicted sub-frame assembly 114 has a pair of long frame members 120, 122 that are joined by connecting members 124, 126, 128 to thereby produce a generally rectangular component that is supported by a plurality, and in this case eight, like, adjustable leveling assemblies 130. Four such adjustable leveling assemblies 130 are provided on each long frame member 120, 122 spaced at regular intervals. Each leveling assembly 130 consists of a bottom pad 132 with a flat bottom surface 134 to facially engage the support surface 40. Each pad 132 is supported upon a threaded rod 136 that can be turned within a complementarily-threaded block 138 to selectively vary the vertical height of the pad 132. At least one opening 140 is provided on each pad 132 to accept an anchor that can be directed into the support surface 40.

The linear slide bearing assembly 116 consists of at least one, and more preferably two, like rails 142, 144, mounted one each upon the top of the long frame members 120, 122, respectively, to be in fixed relationship with each other. The rails 142, 144 extend over the majority of the length of the long frame members 120, 122. By separately adjusting the leveling assemblies 130, the sub-frame assembly 114 can be oriented and stably supported upon, even potentially irregular support surfaces 40 to thereby place the rails 142, 144 in a desired horizontal orientation without having to significantly alter the surface 40 itself.

In addition to the rails 142, 144, the slide bearing assembly 116 is made up of at least first and second, and more preferably a greater number as hereinafter described, of slide bearing sub-assemblies 146 on the main frame 112 that each captively engages one of the rails 142, 144 along the frame member 120 on the sub-frame assembly 114, 142, 144, to thereby guide the main frame 112 and roll stand assembly 108 between the extended and retracted positions in the travel path, as indicated by the double-headed arrow at 148 in FIG. 6. The slide bearing sub-assemblies 146 all have the same general construction and thus description herein will be focused on one such sub-assembly 146, as shown particularly in FIG. 18.

The main frame 112 has a depending foot 150 that supports a housing 152. The housing 152 is connected to the foot 150 through a pivot pin 154, whereby a modicum of movement is allowed between the housing 152 and associated rail 142 to prevent jamming between these components as the main frame 112 and roll stand assembly 108 are moved between the retracted and operating positions.

The sub-assembly 146 further includes end slide plates 156 of like construction that are bolted to the housing 152. The slide plates 156 and rail 142 are configured so that they are each operably engageable and separable with the slide plates 156 at a lengthwise location that, in this embodiment, is the free end 158 of the rail 142. Once the slide plates 156 are slid from the first location, at the free end 158, along the rail 142 to a second lengthwise location, they become keyed to the rail 142 so that they cannot be separated therefrom by movement in a direction transverse to the length of the rail 142. The slide plates 156 on the main frame 112 define surfaces that slide/translate guidingly in a linear path against and relative to the rail 142. The surfaces are fixed to move as one piece with the main frame 112.

The rail 142, as viewed in cross-section taken transversely to the length of the rail 142, has a base 160, and enlarged head 162, and a reduced neck 164 between the base 160 and head 162. The head 162 is bounded by surfaces that have an upwardly opening "V" shape. The slide plates extend around the head 162 and conform to the outer surface of the rail in the regions at the head 162 and neck 164.

Within the housing 152, a series of conventional-type bearing elements (not shown) reside and act between the housing 152 and rail 142 to smoothly guide translation of the sub-assembly 146 along the length of the rail 142.

To move the main frame 112 and roll stand assembly 108 in the travel path between the operating and retracted positions, a drive assembly is provided at 172. The drive assembly 172 consists of a drive motor 174, an elongate shaft 176 that is turned by the motor 174 selectively in first and second opposite directions around its central axis 180, and an advancing element 182 on the main frame 112. The advancing element 182 cooperates with the elongate shaft 176 to move guidingly along the shaft axis 180 in first and second opposite directions, as an incident of the drive motor 174 causing the elongate shaft 176 to be turned. Turning the shaft in opposite directions effects movement of the main frame 112 and roll stand assembly 108 in opposite directions in the travel path.

An L-shaped bracket support 184 is mounted on the long frame member 120 on the sub-frame assembly 114 and supports an end of the elongate shaft 176. The elongate shaft 176 is thus supported so that the advancing element 182 moves along the elongate shaft 176 between the drive motor 174 and the bracket support 184.

Figure 18:
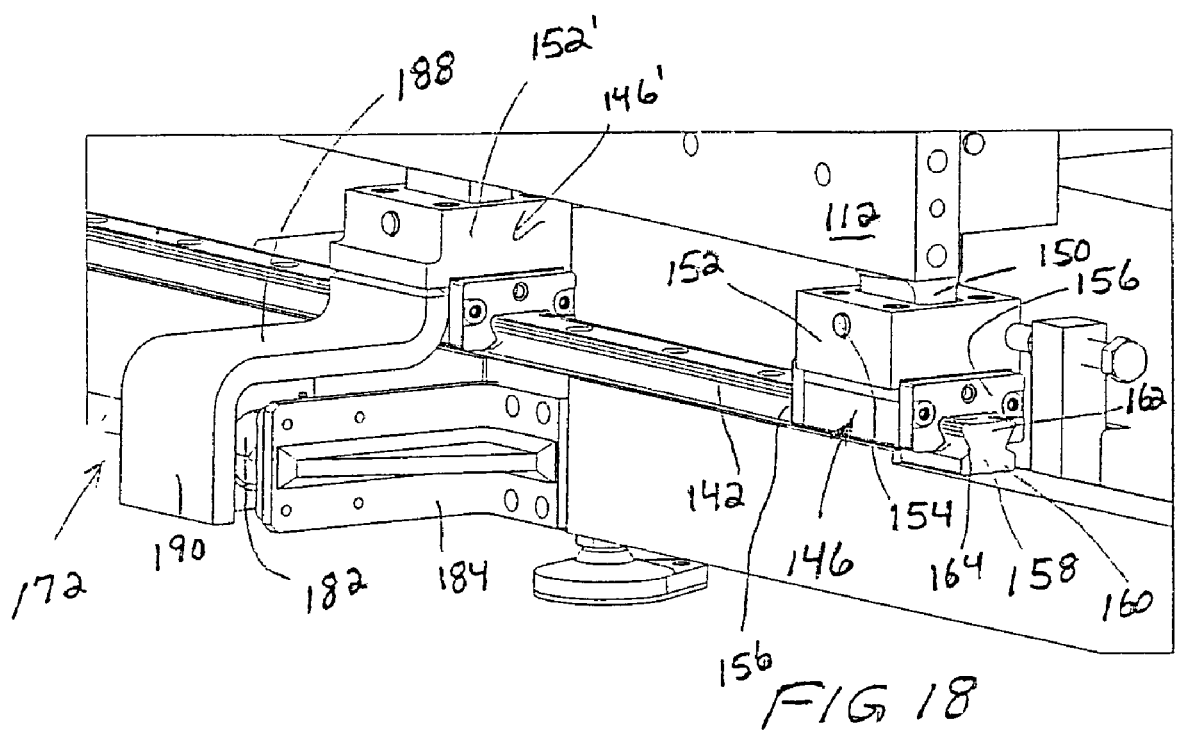
FIG. 18 is an enlarged, fragmentary, perspective view of cooperating slide bearing components on the roll stand assembly and an underlying sub-frame assembly within the box shown in FIGS. 11 and 15.

An L-shaped shield assembly at 186 is provided upon the slide bearing sub-assembly 146' on the main frame 112 immediately downstream of the previously described slide bearing sub-assembly 146 shown in FIG. 18. The shield assembly 186 has one leg attached to the housing 152' on the housing 146'. The transverse leg 190 is situated in a depending fashion. The legs 188, 190, in conjunction with the bracket support 184, shield the advancing element 182 from downward, lateral, and upstream-to-downstream contact, thereby to avoid damage to the drive assembly, as by impact from an object in the vicinity of the apparatus 90 moving in these directions, or residing in the path of the moving main frame 112 and roll stand assembly 108.

In the depicted embodiment, the sheet take-off sub-assembly 110 is cantilevered mounted at the downstream end 192 of the roll stack sub-assembly 100. With this arrangement, the sheet take-off sub-assembly 110 does not have to be directly supported upon the rails 142, 144. Consequently, the length of the rails can be made to be approximately equal to the lengthwise dimension D of the roll stand assembly 108 between the upstream and downstream ends thereof. As can be seen in exemplary FIG. 12, if the sheet take-off sub-assembly 110 was required to be supported upon the rails 142, 144, the rails 142, 144 would have to be extended significantly in a downstream direction to accommodate the retracted position for the main frame 112 and roll stand assembly 108.

Figure 6:
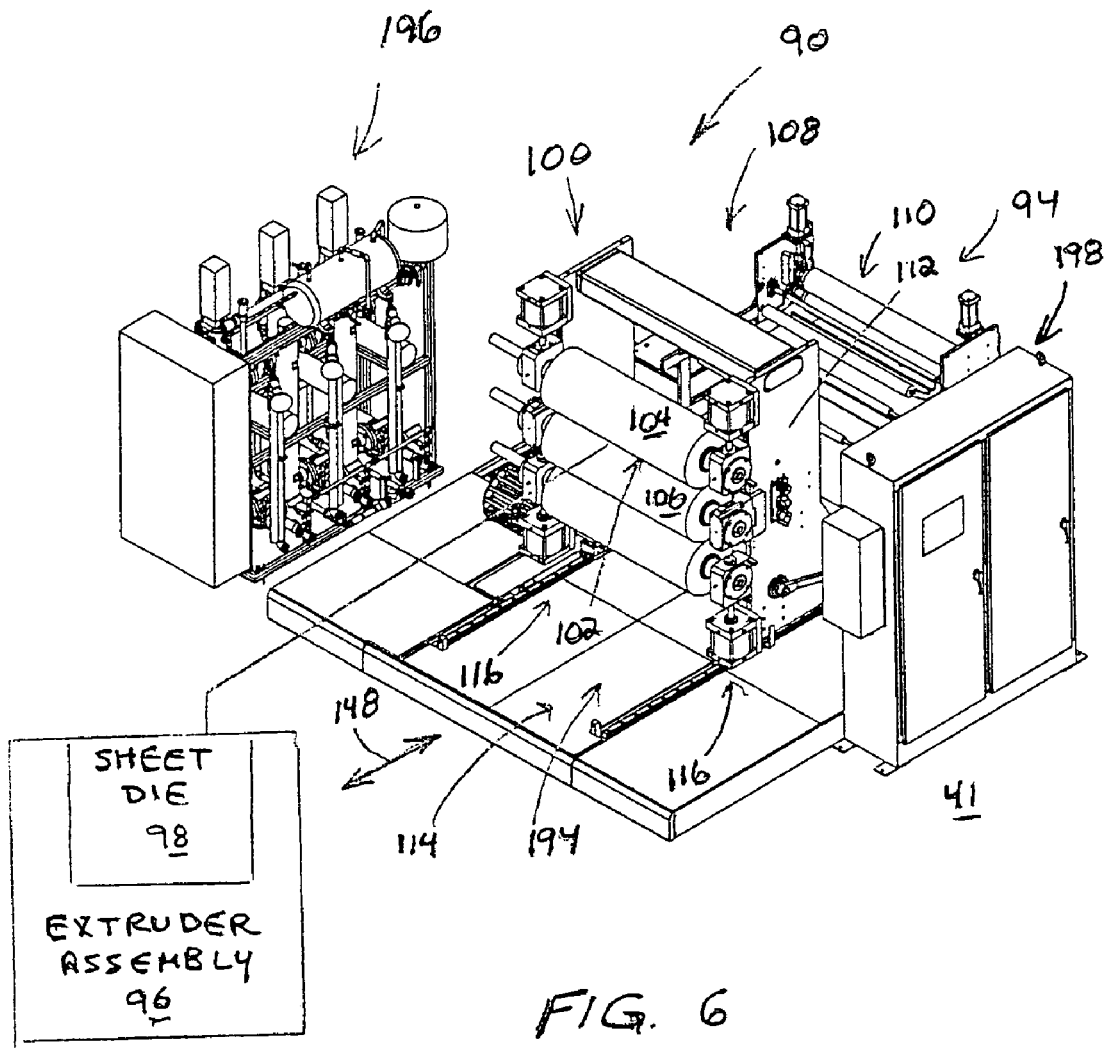
FIG. 6 is a partially schematic, perspective view of an apparatus for forming an extruded sheet product, according to the present invention, and with a roll stand assembly thereon in a retracted position relative to an extruder assembly.
Figure 7:
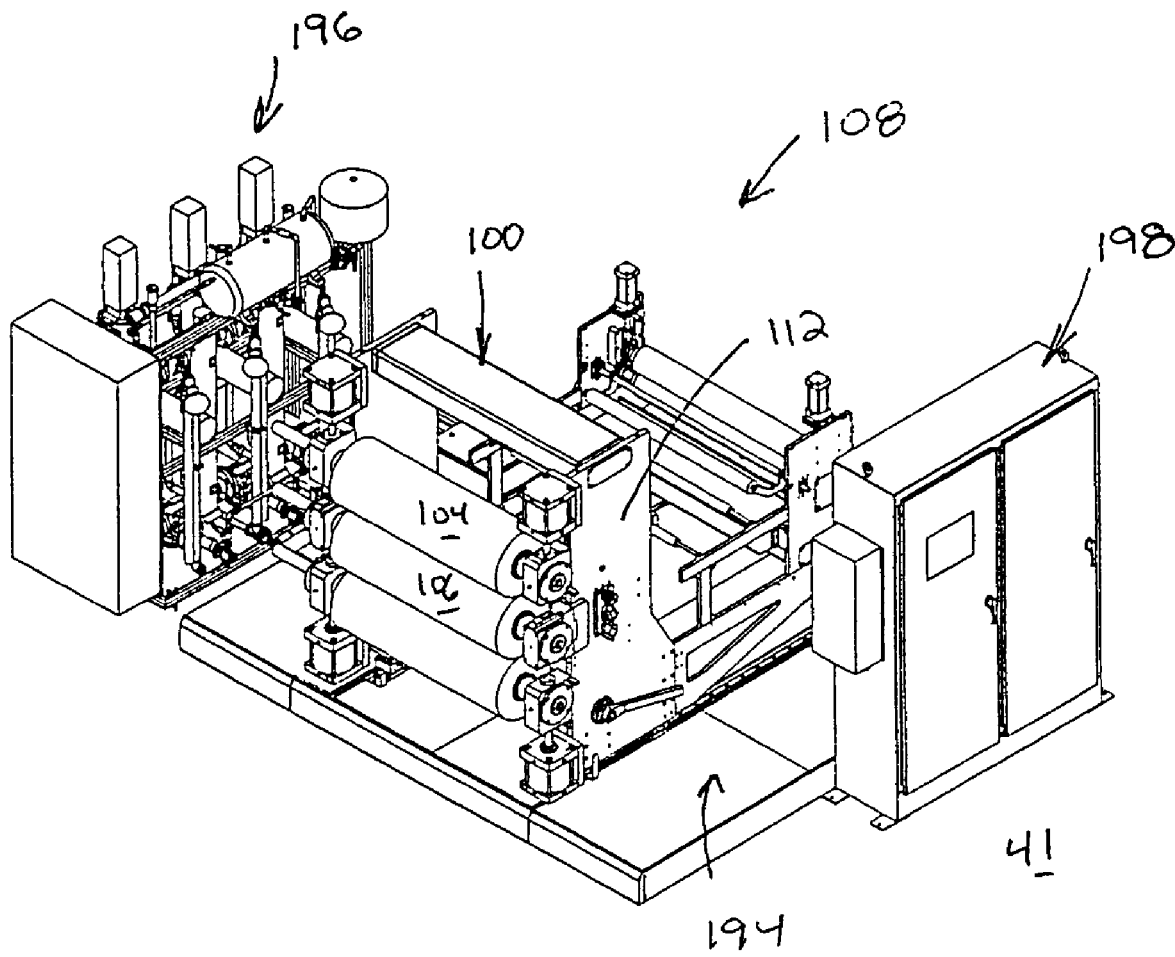
FIG. 7 is a view as in FIG. 6 wherein the roll stand assembly is moved from the retracted position into an operating position.
Figure 8:
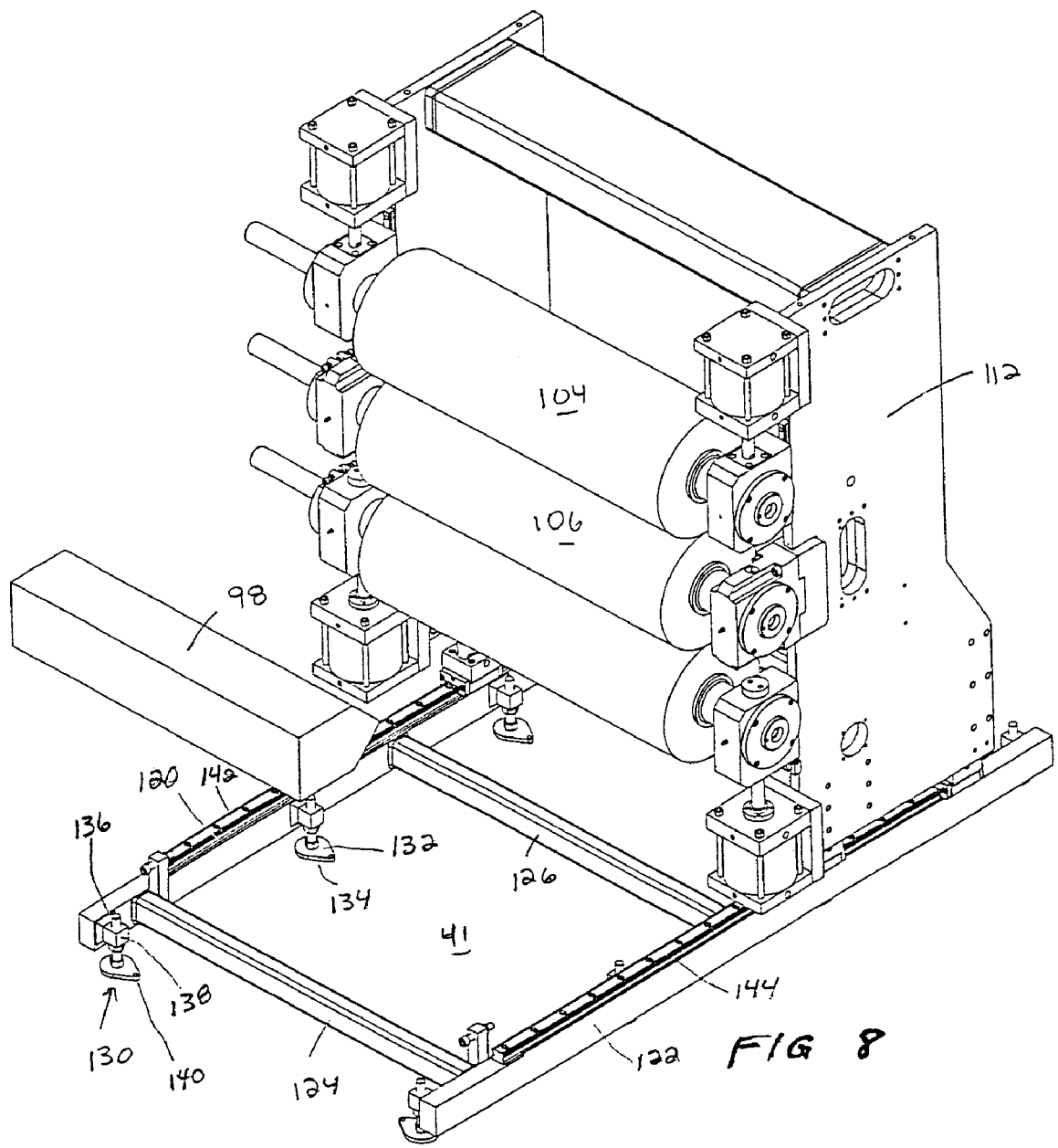
FIG. 8 is an enlarged, perspective view of the isolated roll stand assembly in relationship to one specific form of sheet die.
Figure 9:
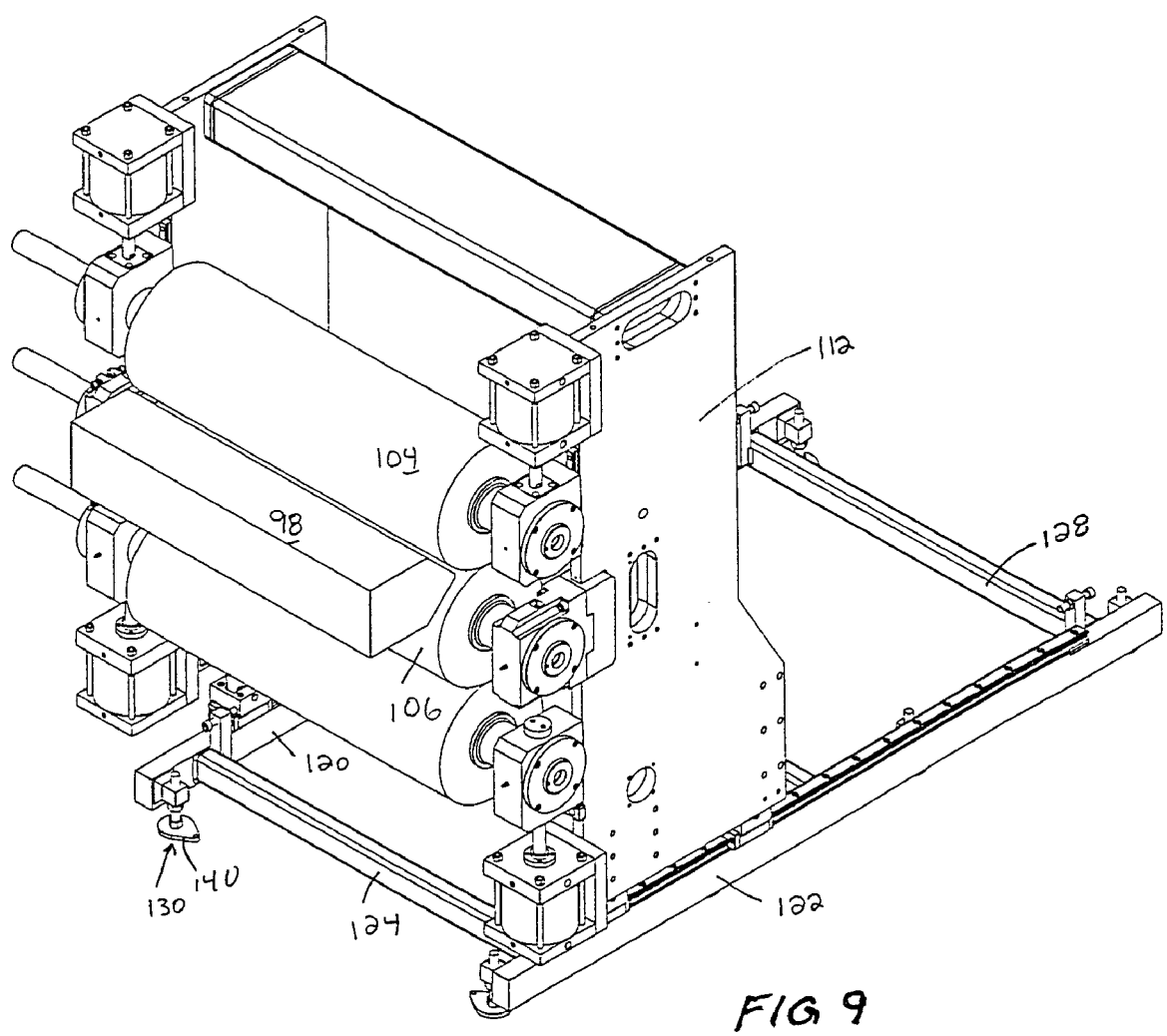
FIG. 9 is a view as in FIG. 8 with the roll stand assembly changed into the operating position therefor.
Figure 10:
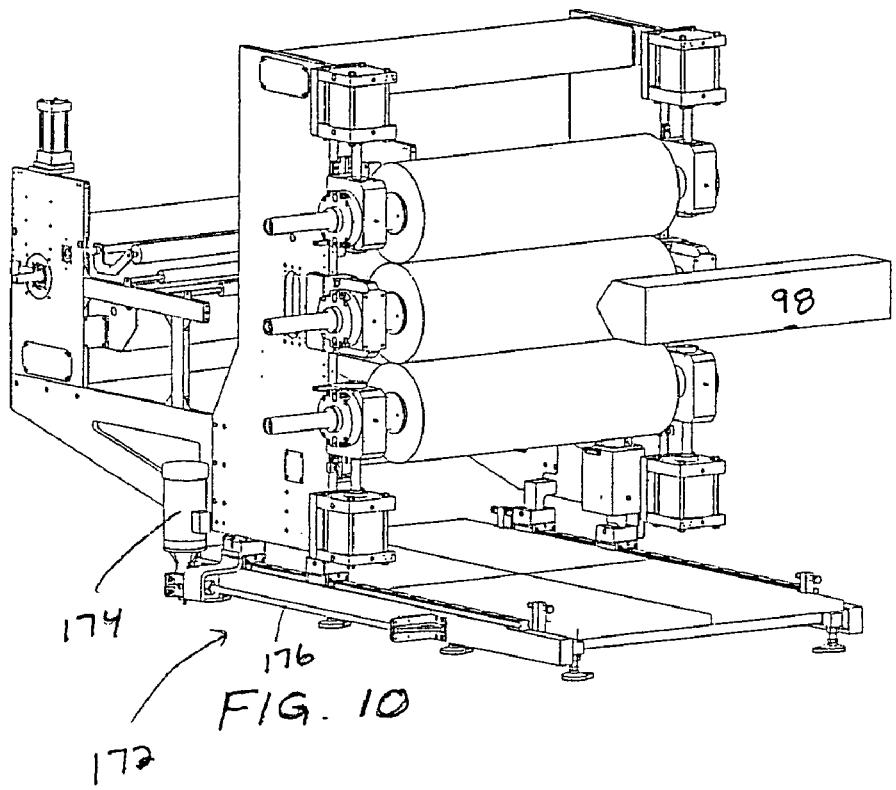
FIG. 10 is a view of the roll stand assembly in the retracted position and from a different perspective than in FIG. 8.
Figure 11:
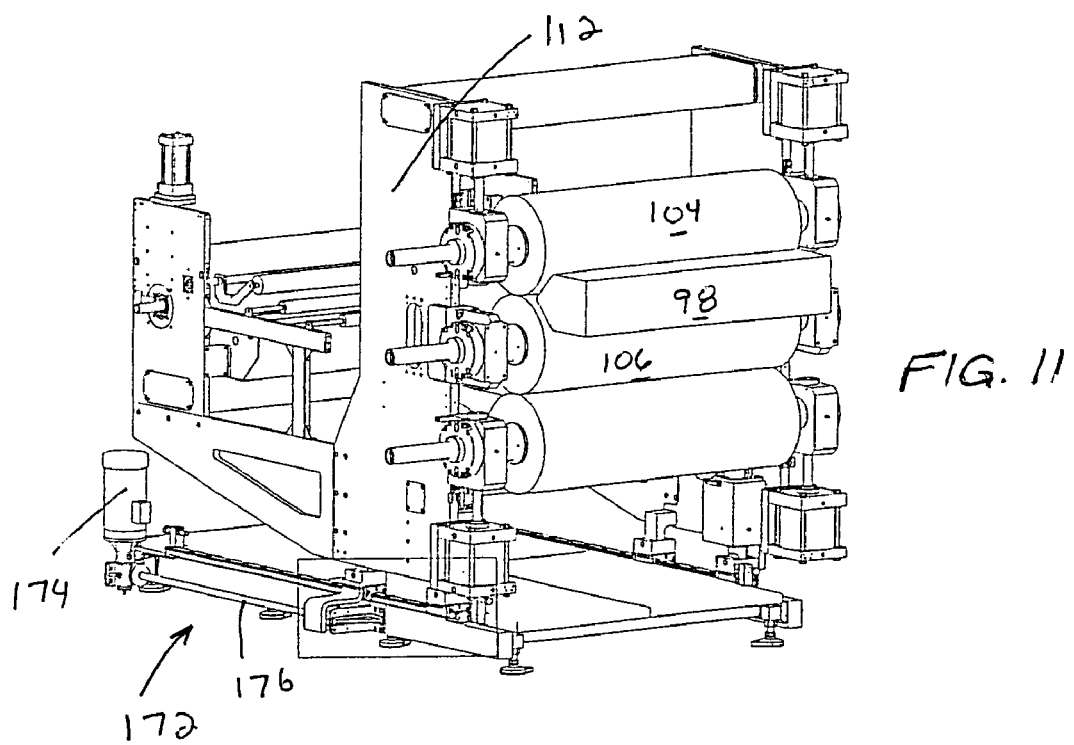
FIG. 11 is a view of the roll stand assembly in the operating position and from a different perspective than in FIG. 9.
Figure 12:
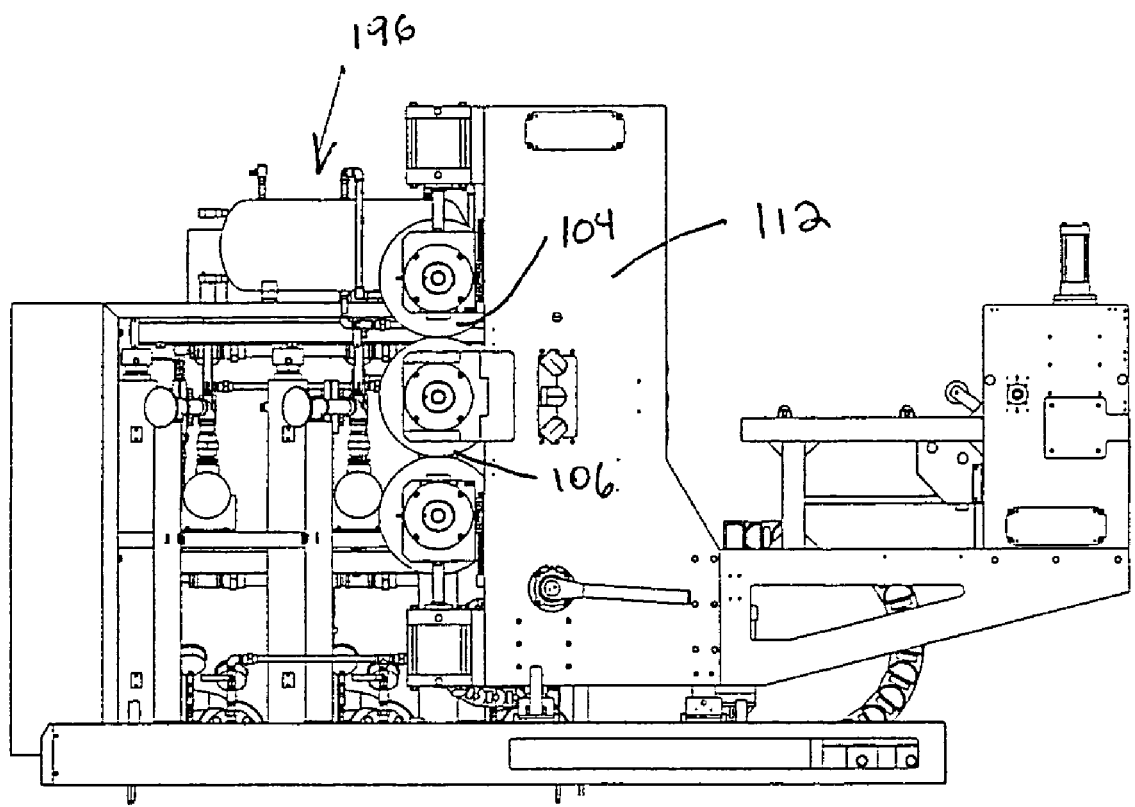
FIG. 12 is a side elevation view of the apparatus with the roll stand assembly in the retracted position.
Figure 13:
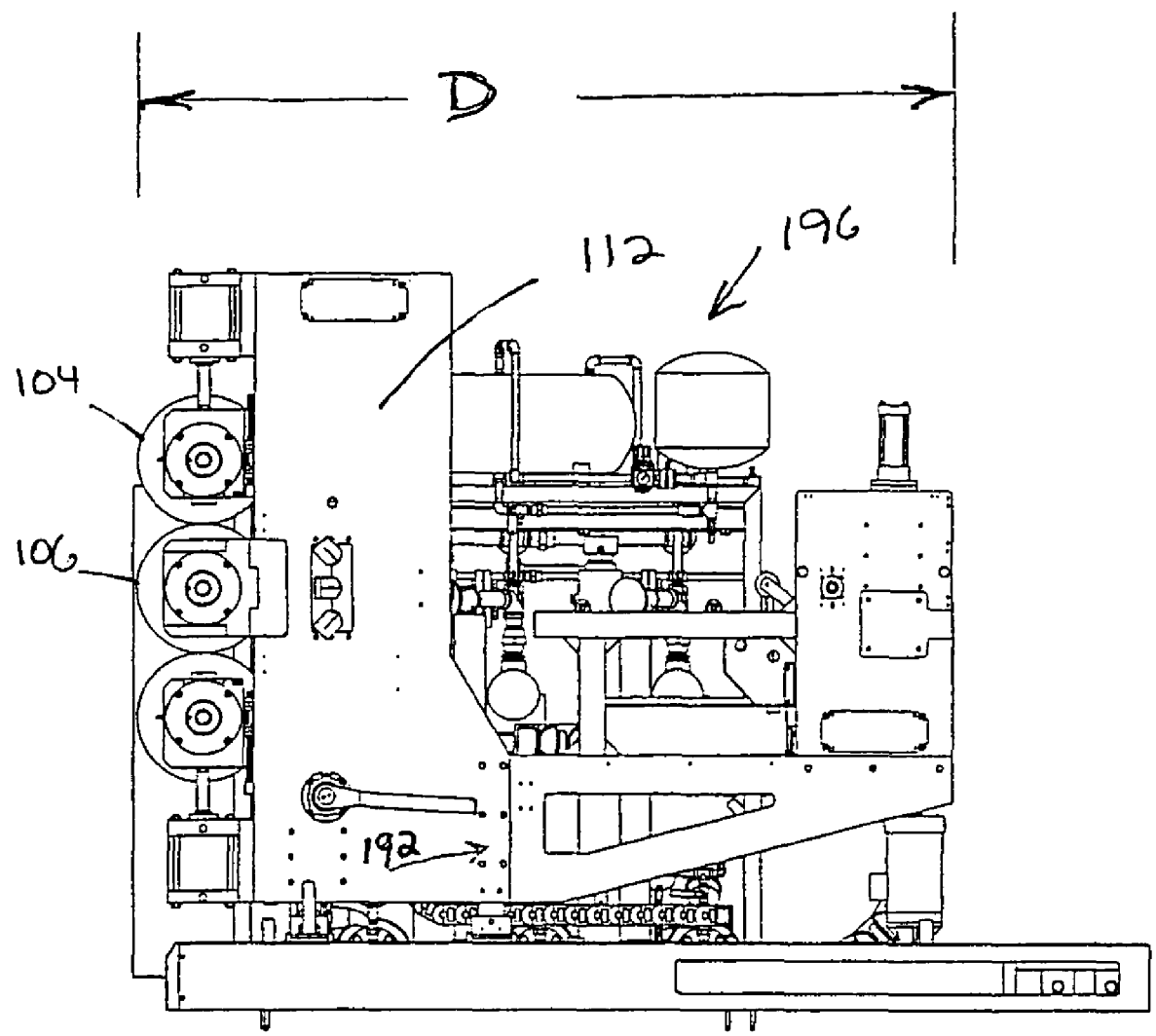
FIG. 13 is a side elevation view of the apparatus with the roll stand assembly in the operating position.
Figure 14:
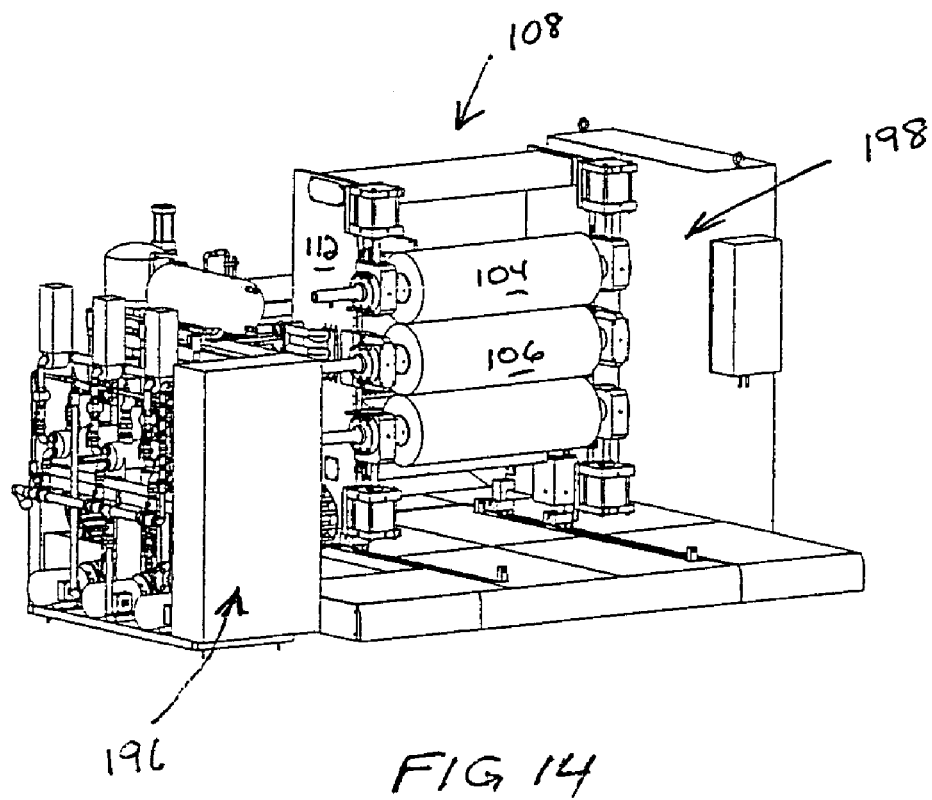
FIG. 14 is a perspective view of the apparatus with the roll stand assembly in the retracted position.
Figure 15:
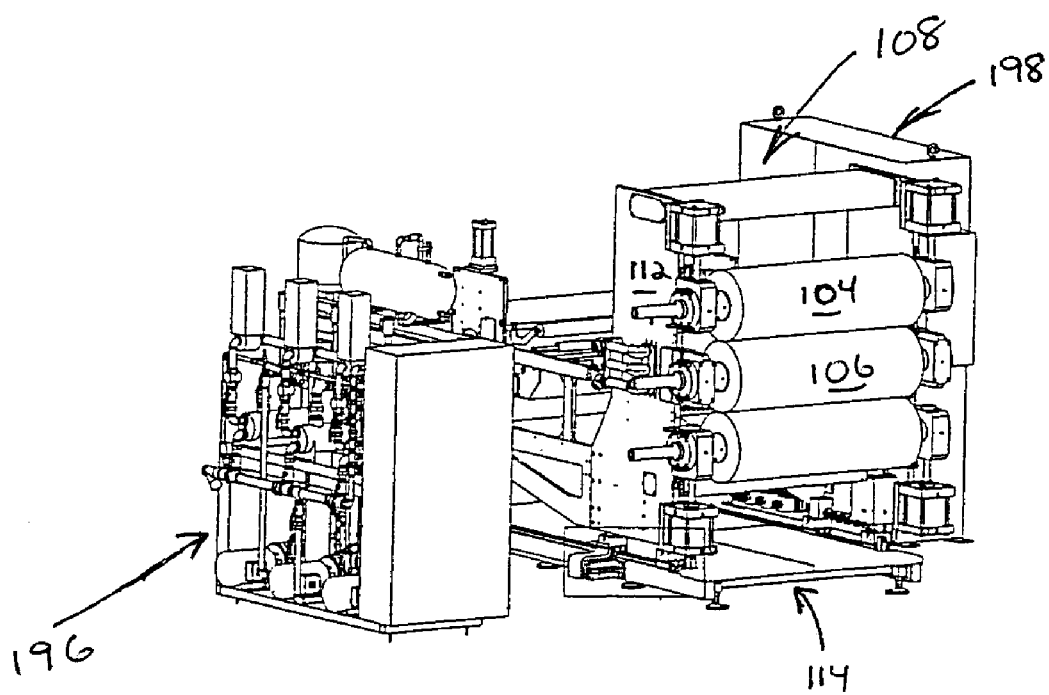
FIG. 15 is a view as in FIG. 14 wherein the roll stand assembly is in the operating position.
Figure 16:
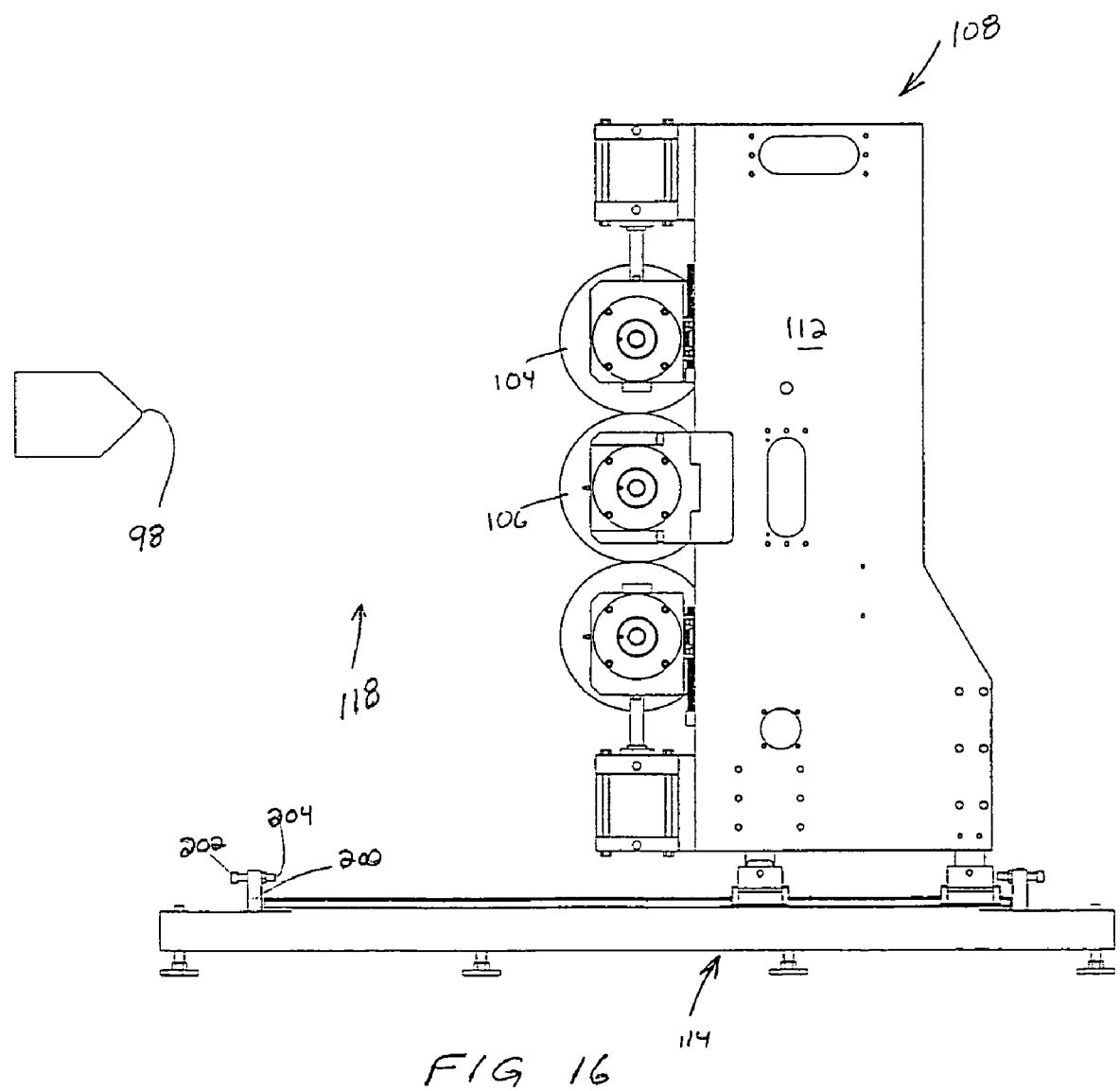
FIG. 16 is an enlarged, side, elevation view of a roll stack sub-assembly on the roll stand assembly in a retracted position relative to the sheet die.
Figure 17:
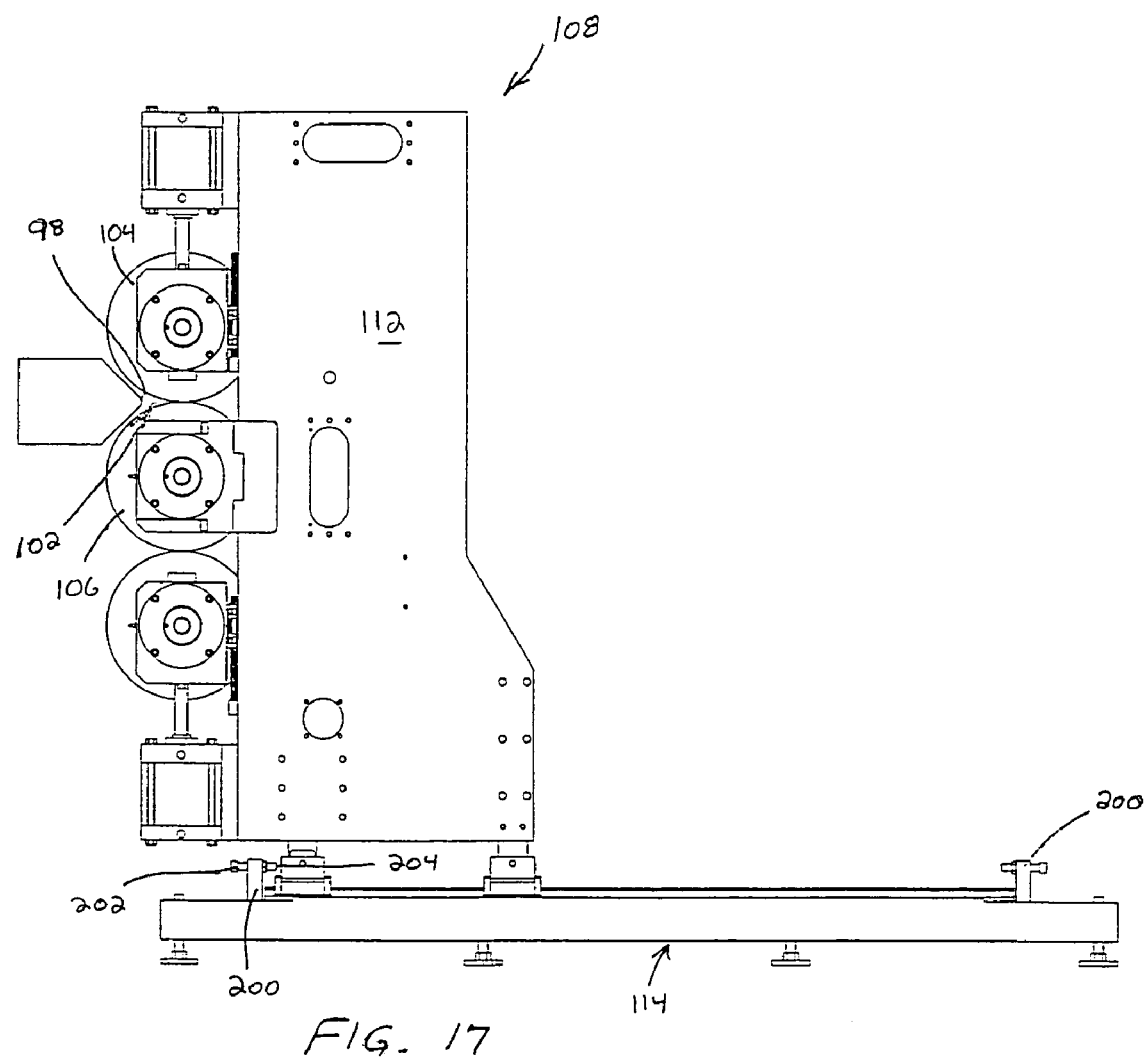
FIG. 17 is a view as in FIG. 16 wherein the roll stack assembly is moved into an operating position.

As can be seen most clearly in FIG. 6, the sub-frame assembly 114 may additionally include a floor assembly 194, made up of one or more floor panels that fully span, and cover, the region between the rails 142, 144.

As shown in FIG. 6, the floor 194 extends around each of the sides of the roll stand assembly 108 to define a space within which a worker might navigate to access different portions of the roll stand assembly 108 and additionally to access a temperature control system at 196 and a central control system at 198.

The temperature control system corresponds to that described in the prior art. With the temperature control system, the temperature of components on the roll stand assembly 108 can be selectively controlled during the sheet forming processes.

The main/central control system 198 includes controls through which programmed operation of the apparatus 90 is coordinated.

According to the invention, the temperature control system 196 and main control system 198 are fixed to the subjacent support 40 so that the roll stand assembly 108 moves between the operating and retracted positions without requiring any movement of these systems 196, 198. Accordingly, the drive assembly 172 can be made with a less robust construction as it is not required to reposition the systems 196, 198 as in the prior art, previously described.

Adjustable stops 200, each of like construction, are provided, one each, at both ends of the rails 142, 144. Each stop 200 has a threaded bolt 202 with a free end 204, situated to abut to one of the housings 152, 152' at each extreme of the travel path, in which the main frame 112 and roll stand assembly 108 are in the operating and retracted positions. The stops 200 can be placed to abut the main frame 112 to limit the range of movement to a desired degree within the travel path.

As shown in FIGS. 8, 9, 16 and 17, the apparatus 90 may be made in substantially the same manner, as described above, without requiring the sheet take-off sub-assembly 110. Other structure can be incorporated into the roll stand assembly 108 or mounted separately therefrom to control the sheet product outcoming from the roll stack sub-assembly 100.

The foregoing disclosure of specific embodiments is intended to be illustrative of the broad concepts comprehended by the invention.

The invention claimed is:

1. An apparatus for forming an extruded sheet product, the apparatus having an upstream end and a downstream end towards which a completed sheet product is directed, the apparatus comprising:
   an extruder assembly with a sheet die through which flowable material is delivered for sheet product formation;
   a roll stand assembly comprising:
      a) a main frame; and
      b) a roll stack sub-assembly comprising a plurality of rolls on the main frame that cause flowable material from the sheet die to be formed into a sheet product;
   a sub-frame assembly; and
   a linear slide bearing assembly comprising at least one rail defining a travel path for the main frame and through which the main frame is guided in movement relative to the sub-frame assembly thereby to selectively vary relative positions of the sheet die and at least a part of the roll stand assembly along the travel path,
   wherein the apparatus further comprises a temperature control system through which temperature of components on the roll stand assembly can be selectively controlled, and the main frame is movable along the travel path relative to the temperature control system.

2. An apparatus for forming an extruded sheet product, the apparatus having an upstream end and a downstream end towards which a completed sheet product is directed, the apparatus comprising:
   an extruder assembly with a sheet die through which flowable material is delivered for sheet product formation;
   a roll stand assembly comprising:
      a) a main frame; and
      b) a roll stack sub-assembly comprising a plurality of rolls on the main frame that cause flowable material from the sheet die to be formed into a sheet product;
   a sub-frame assembly; and
   a linear slide bearing assembly comprising at least one rail defining a travel path for the main frame and through which the main frame is guided in movement relative to the sub-frame assembly thereby to selectively vary relative positions of the sheet die and at least a part of the roll stand assembly along the travel path,
   wherein the apparatus further comprises a central control system through which operation of the apparatus is coordinated, and the main frame is movable along the travel path relative to the central control system.

3. The apparatus for forming an extruded sheet product according to claim 2 wherein the central control system is configured to coordinate programmed operation of the apparatus.

4. An apparatus for forming an extruded sheet product, the apparatus having an upstream end and a downstream end towards which a completed sheet product is directed, the apparatus comprising:
   an extruder assembly with a sheet die through which flowable material is delivered for sheet product formation;
   a roll stand assembly comprising:
      a) a main frame; and
      b) a roll stack sub-assembly comprising a plurality of rolls on the main frame that cause flowable material from the sheet die to be formed into a sheet product;
   a sub-frame assembly; and
   a linear slide bearing assembly comprising at least one rail defining a travel path for the main frame and through which the main frame is guided in movement relative to the sub-frame assembly thereby to selectively vary relative positions of the sheet die and at least a part of the roll stand assembly along the travel path, wherein the linear slide bearing assembly comprises spaced first and second rails on the sub-frame assembly, wherein the slide bearing assembly further comprises first and second slide bearing sub-assemblies on the main frame that captively engage the first and second rails, respectively.

5. The apparatus for forming an extruded sheet product according to claim 4 wherein the first and second rails each has a length, the first and second slide bearing sub-assemblies respectively comprise first and second slide plates that are engaged, one each, with the first and second rails, the first slide plate operably engageable and separable from the first rail at a first lengthwise location and slidable guidingly lengthwise relative to the first rail from the first lengthwise location to a second lengthwise location at which the first slide plate cannot be separated from the first rail by movement relative to the first rail in a direction transverse to the length of the first rail.

6. The apparatus for forming an extruded sheet product according to claim 5 wherein the first rail has an enlarged head, a base, and a reduced neck as viewed in cross-section transverse to the length of the first rail, and the first slide plate extends around the enlarged head.

7. The apparatus for forming an extruded sheet product according to claim 6 wherein the enlarged head has an upwardly opening "V" shape as viewed in cross-section transverse to the length of the first rail.

8. An apparatus for forming an extruded sheet product, the apparatus having an upstream end and a downstream end towards which a completed sheet product is directed, the apparatus comprising:
  an extruder assembly with a sheet die through which flowable material is delivered for sheet product formation;
  a roll stand assembly comprising:
    a) a main frame; and
    b) a roll stack sub-assembly comprising a plurality of rolls on the main frame that cause flowable material from the sheet die to be formed into a sheet product;
  a sub-frame assembly; and
  a linear slide bearing assembly comprising at least one rail defining a travel path for the main frame and through which the main frame is guided in movement relative to the sub-frame assembly thereby to selectively vary relative positions of the sheet die and at least a part of the roll stand assembly along the travel path,
  wherein the linear slide bearing assembly comprises spaced first and second rails on the sub-frame assembly,
  wherein the first and second rails are mounted on the sub-frame assembly in fixed relationship to each other,
  wherein the sub-frame assembly comprises spaced, adjustable leveling assemblies that act against a subjacent support for the apparatus thereby to allow controlled orientation of the first and second rails.

9. An apparatus for forming an extruded sheet product, the apparatus having an upstream end and a downstream end towards which a completed sheet product is directed, the apparatus comprising:
  an extruder assembly with a sheet die through which flowable material is delivered for sheet product formation;
  a roll stand assembly comprising:
    a) a main frame; and
    b) a roll stack sub-assembly comprising a plurality of rolls on the main frame that cause flowable material from the sheet die to be formed into a sheet product;
  a sub-frame assembly; and
  a linear slide bearing assembly comprising at least one rail defining a travel path for the main frame and through which the main frame is guided in movement relative to the sub-frame assembly thereby to selectively vary relative positions of the sheet die and at least a part of the roll stand assembly along the travel path,
  wherein the linear slide bearing assembly comprises spaced first and second rails on the sub-frame assembly,
  wherein there are spaced stops on the first rail that abut to the main frame to limit range of movement of the main frame in the travel path.

10. A roll stand assembly to be used in conjunction with an extrusion assembly with a sheet die that delivers flowable material to the roll stand assembly for sheet product formation, the roll stand assembly comprising:
  a main frame;
  a roll stack sub-assembly comprising a plurality of rolls on the main frame that cause flowable material delivered to an upstream end of the roll stack sub-assembly to be formed into a sheet product;
  a sheet take-off sub-assembly on the main frame that directs sheet product formed by the plurality of rolls away from the plurality of rolls in a downstream direction;
  a sub-frame assembly; and
  a linear bearing assembly comprising at least one rail defining a travel path for the main frame and through which the main frame is guided in movement relative to the sub-frame assembly thereby to selectively place the roll stack sub-assembly in different positions relative to a sheet die on an extrusion assembly with which the roll stand assembly cooperates,
  wherein the linear bearing assembly comprises spaced first and second rails on the sub-frame assembly and first and second slide bearing sub-assemblies on the main frame that captively engage the first and second rails, respectively.

11. The roll stand assembly according to claim 10 further comprising a drive assembly for controllable movement of the main frame in the travel path, the drive assembly comprising a drive motor, an elongate shaft with an axis around which the elongate shaft is driven by the drive motor selectively in first and second turning directions, and an advancing element on the main frame that cooperates with the elongate shaft to move guidingly along the shaft axis in first and second opposite directions as an incident of the drive motor causing the elongate shaft to be turned, respectively, in the first and second turning directions, in response to which the main frame is moved in opposite directions in the travel path.

* * * * *